(12) United States Patent  (10) Patent No.: US 9,120,942 B2
Kunimine et al.  (45) Date of Patent: Sep. 1, 2015

(54) IMAGE RECORDING METHOD

(71) Applicant: CANON KABUSHIKI KAISHA, Tokyo (JP)

(72) Inventors: Noboru Kunimine, Tokyo (JP); Takao Ogata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 13/950,069

(22) Filed: Jul. 24, 2013

(65) Prior Publication Data

US 2014/0028766 A1  Jan. 30, 2014

(30) Foreign Application Priority Data

Jul. 26, 2012 (JP) ................................. 2012-165882

(51) Int. Cl.
*B41J 2/01* (2006.01)
*C09D 11/30* (2014.01)
*B41J 2/21* (2006.01)
*C09D 11/324* (2014.01)
*C09D 11/38* (2014.01)
*C09D 11/40* (2014.01)
*B41J 2/205* (2006.01)

(52) U.S. Cl.
CPC .............. *C09D 11/30* (2013.01); *B41J 2/2107* (2013.01); *C09D 11/324* (2013.01); *C09D 11/38* (2013.01); *C09D 11/40* (2013.01); *B41J 2/2056* (2013.01); *B41J 2/2114* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41M 5/0011; B41M 5/0017; B41M 7/00; C09D 11/36; C09D 11/40; C09D 11/30; C09D 11/38; C09D 11/322; C09D 11/328; C09D 11/101; C09D 11/005; C09D 11/54; C09D 11/52
USPC ......... 347/100, 95, 96, 101, 102, 103, 88, 99, 347/105, 21, 20, 9; 106/31.6, 31.13, 31.27; 523/160, 161
See application file for complete search history.

(56) References Cited

U.S. PATENT DOCUMENTS

| | | | | |
|---|---|---|---|---|
| 6,342,095 | B1 * | 1/2002 | Takizawa et al. | 106/31.6 |
| 2002/0036677 | A1 * | 3/2002 | Watanabe et al. | 347/100 |
| 2004/0035320 | A1 * | 2/2004 | Sano et al. | 347/100 |
| 2005/0247235 | A1 * | 11/2005 | Voeght et al. | 106/31.6 |
| 2010/0149258 | A1 * | 6/2010 | Mizutani | 347/43 |

FOREIGN PATENT DOCUMENTS

JP  2000-007964 A  1/2000

* cited by examiner

*Primary Examiner* — Manish S Shah
(74) *Attorney, Agent, or Firm* — Canon USA, Inc., IP Division

(57) ABSTRACT

The image recording method includes a first process of applying a first black ink containing a pigment to a record medium; and, after the first process, a second process of applying a second black ink containing a pigment to the record medium such that the second ink at least partly overlaps the first black ink, in which the first black ink contains a salt containing at least one kind of cation selected from the group consisting of an alkali metal ion, an ammonium ion, and an organic ammonium ion and at least one kind of anion, and the static surface tension of the first black ink is higher than the static surface tension of the second black ink.

6 Claims, 1 Drawing Sheet

IMAGE RECORDING METHOD

BACKGROUND OF THE INVENTION

1. Field of the Invention

The present invention relates to an image recording method.

2. Description of the Related Art

An image recording method using two kinds of black ink containing pigments has been examined (Japanese Patent Laid-Open No. 2000-007964. Japanese Patent Laid-Open No. 2000-007964 discloses that the optical density of an image improves according to an image recording method including causing an anionic pigment black ink to react with a cationic pigment black ink. However, an examination of the present inventors has shown that, according to the image recording method described in Japanese Patent Laid-Open No. 2000-007964, the optical density of the image improves but the highlighter resistance of the image is low.

SUMMARY OF THE INVENTION

Therefore, it is an object of the invention to provide an image recording method which provides an image with a high optical density and high highlighter resistance.

The purpose is achieved by the invention described below. More specifically, the image recording method according to the invention has a first process of applying a first black ink containing a pigment to a record medium; and, after the first process, a second process of applying a second black ink containing a pigment to the record medium such that the second black ink at least partly overlaps the first black ink, in which the first black ink contains a salt containing at least one kind of cation selected from the group consisting of an alkali metal ion, an ammonium ion, and an organic ammonium ion and at least one kind of anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$, and the static surface tension of the first black ink is higher than the static surface tension of the second black ink.

The invention can provide an image recording method which provides an image with a high optical density and high highlighter resistance.

Further features of the present invention will become apparent from the following description of exemplary embodiments with reference to the attached drawing.

DESCRIPTION OF THE EMBODIMENTS

Figure 1A:
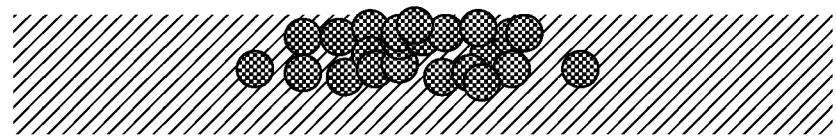
FIGS. 1A to 1C are schematic views of the cross section for explaining the state of pigments applied to a record medium.
Figure 1B:
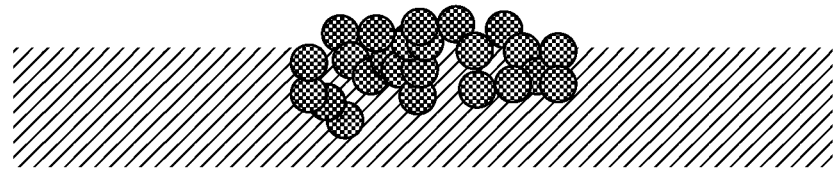
Figure 1C:
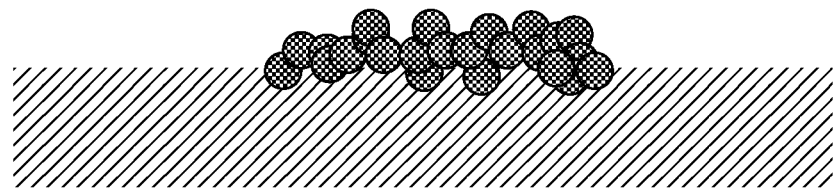

Hereinafter, the invention is described in detail with reference to suitable embodiments. The present inventors have first examined a cause by which the highlighter resistance of an image has decreased in the image recording method of Japanese Patent Laid-Open No. 2000-007964. This is described with respect to FIG. 1. In Japanese Patent Laid-Open No. 2000-007964, when the black ink containing the anionic pigment and the black ink containing the cationic pigment contact each other on the record medium, the pigments are solidified by an anioncation reaction, so that the pigments remain on the surface of the record medium (FIG. 1C). As a result, the optical density of the image has improved. On the other hand, however, the pigments present on the surface of the record medium are easily scratched away when receiving the external force caused by drawing a highlighter, so that the highlighter resistance of the image has been low. On the other hand, as illustrated in FIG. 1A, when the pigments enter the inside of the record medium, the highlighter resistance of the image has improved but the optical density of the image has become low. Thus, the optical density and the highlighter resistance of the image have a trade-off relationship with each other. Then, when the present inventors have conducted research, it has been found that when the state where the pigments are caused to be present in a surface proximal region as illustrated in FIG. 1B can be achieved instead of the state where the pigments remain on the surface of the record medium (FIG. 1C) or the state where the pigments enter the inside (FIG. 1A), an improvement of the optical density and the highlighter resistance of the image can be achieved. Then, when the present inventors have examined various conditions of the image recording method under which the pigments can be present in the surface proximal region, the present inventors have found the configuration of the invention. A mechanism which allows achieving both the optical density and the highlighter resistance of an image by the configuration of the invention is described below.

In order to cause the pigments to be present in the surface proximal region of the record medium as illustrated in FIG. 1B, the aggregation of the pigments needs to be promoted. However, in the case of a strong aggregation reaction, such as the anion-cation reaction as described above, the state where the pigments remain on the surface of the record medium (FIG. 1C) is formed, so that the highlighter resistance of the image decreases. Then, when the present inventors have examined conditions under which the pigments cause a weak aggregation reaction, the present inventors have reached an idea of using "salt".

In the invention, the salt refers to a compound containing at least one kind of cation selected from the group consisting of an alkali metal ion, an ammonium ion, and an organic ammonium ion and at least one kind of anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$. When the salt is added into an ink containing a pigment, charge neutralization arises due to anions and cations generated when the salt is ionized, so that the electrostatic repulsion which disperses the pigments decreases, which results in the fact that the dispersion stability of the pigments decreases. More specifically, the salt does not positively cause the pigments to aggregate but can promote the aggregation of the pigments by lowering the dispersion stability of the pigments. By adjusting the concentration of the salt, the aggregation reaction of the pigments can be controlled.

Based on the examination described above, the present inventors have examined an image recording method including applying a clear ink containing the salt to a record medium, and then applying a black ink containing a pigment. However, both the optical density and the highlighter resistance of the image have improved to some extent but have not reached a required level. Then, when the present inventors have examined an image recording method including applying a first black ink containing the salt and a pigment to a record medium, and then applying a second black ink containing a pigment, both the optical density and the highlighter resistance of the image have improved. This is considered to occur based on the following reasons.

When the first black ink is applied to the record medium, the concentration of the salt increases due to the evaporation of water, so that the pigment partially aggregates by the action of the salt. Thus, when the first black ink is applied to the record medium, the aggregated pigment and the salt are present near the surface of the record medium. When the second black ink is further applied thereto, the penetration of the second black ink to the inside of the record medium is suppressed by the aggregated pigment present in the surface proximal region of the record medium. Furthermore, since the pigment of the second black ink reacts to the salt to aggregate in the surface proximal region of the record medium, the pigments can be caused to be efficiently present in the surface proximal region of the record medium. Thus, it is considered that both the optical density and the highlighter resistance of the image have improved.

According to a further examination of the present inventors, it has found that the effect that the optical density and the highlighter resistance of the image improve is obtained when the static surface tension ($\gamma_1$) of the first black ink is higher than the static surface tension ($\gamma_2$) of the second black ink, i.e., the permeability of the first black ink is lower than that of the second black ink. This is considered to occur because the resin aggregated pigment and the salt derived from the first black ink are likely to be present in the surface proximal region of the record medium, so that a reaction with the pigment of the second black ink more efficiently occurs.

Due to the fact that each constituent component of the invention synergistically work as in the mechanism described above, a high level optical density and high level highlighter resistance of an image which has not been obtained according to former image recording methods can be obtained.

Image Recording Method

Hereinafter, a description is given while defining a black ink containing a pigment and the salt as a first black ink and defining an ink, which contains a pigment and is applied to the record medium after the first black ink is applied, as a second black ink.

The image recording method of the invention has a first process of applying the first black ink to a record medium and, after the first process, a second process of applying the second black ink to the record medium in such a manner as to at least partly overlap the region where the first black ink is applied.

In the invention, as an application unit of the first black ink and the second black ink to the record medium, a method employing an ink jet system recording head is suitable. In particular, an ink jet recording method is more suitable which includes causing thermal energy to act on the ink to discharge the ink from a discharge port of the recording head. The "record" as used in the invention includes an aspect of performing recording on recording media, such as glossy paper and plain paper and an aspect of performing printing on recording media, such as glass, plastic, and film provided with an ink receiving layer. In the invention, when used for plain paper and plotter paper, a particularly noticeable effect is obtained. Thus, the use thereof is suitable. Hereinafter, the first ink and the second ink for use in the ink jet recording method of the invention are described.

Components of First Black Ink and Second Black Ink

Components usable in the first black ink and the second black ink in the invention are individually described.

Pigment

In the invention, the first black ink and the second black ink contain pigments. As the pigments, any known pigment can be used. The content (% by mass) of the pigment is suitably 0.1% by mass or more and 15.0% by mass or lower and more suitably 1.0% by mass or more and 10.0% by mass or lower based on the total mass of each black ink. The content of the pigment in the first black ink is particularly suitably 1.0% by mass or more and 3.0% by mass or lower. When the content is lower than 1.0% by mass, the effect of suppressing the permeation of the second black ink to the inside of the record medium is weak, so that the improvement effect of the optical density of the image is not sufficiently obtained in some cases. When the content is higher than 3.0% by mass, the dispersion stability of the pigment of the first black ink is not sufficiently obtained in some cases. On the other hand, the content of the pigment in the second black ink is particularly suitably 3.0% by mass or more and 6.0% by mass or lower. When the content is lower than 3.0% by mass, the absolute amount of the pigment is small, so that the improvement effect of the optical density of an image is not sufficiently obtained in some cases. When the content is higher than 6.0% by mass, the dispersion stability of the pigment in the second black ink is not sufficiently obtained in some cases.

In the invention, mentioned as a dispersion method of the pigment are a resin dispersion type pigment in which resin is used as a dispersant (a resin dispersion pigment in which a resin dispersant is used, a microcapsule pigment in which the surface of pigment particles is coated with resin, and a resin bonded pigment in which an organic group containing resin is chemically bonded to the surface of pigment particles) and a self-dispersion type pigment in which a hydrophilic group is introduced into the surface of resin particles (a self-dispersion pigment). It is a matter of course that the pigments different in the dispersion method can also be used in combination. In the invention, it is suitable that the pigment dispersion methods of the first black ink and the second black ink are the same. For example, it is suitable that when the first black ink is a self-dispersion pigment, the second black ink is also a self-dispersion pigment.

When the pigment for use in the ink is the resin dispersion type pigment, resin is used as a dispersant. The resin to be used as a dispersant (resin dispersant) suitably has both a hydrophilic portion and a hydrophobic portion. Specifically mentioned are acrylic resin which is polymerized using hydrophilic monomers having carboxyl groups, such as acrylic acid and methacrylic acid, and hydrophobic monomers having aromatic groups, such as styrene, benzyl acrylate, and benzyl methacrylate; urethane resin which is polymerized using diol having anionic groups, such as dimethylol propionic acid; and the like. The acid value of the resin dispersant is suitably 50 mgKOH/g or more and 300 mgKOH/g or lower. The weight average molecular weight (Mw) of the resin dispersant in terms of polystyrene obtained by a gel permeation chromatography (GPC) is suitably 1,000 or more and 15,000 or lower. The content (% by mass) of the resin dispersant in the ink is suitably 0.1% by mass or more and 10.0% by mass or lower and more suitably 0.2% by mass or more and 4.0% by mass or lower based on the total mass of the ink. It is suitable that the content (% by mass) of the resin dispersant is 0.1 times or more and 1.0 times or lower in terms of mass ratio based on the content (% by mass) of the pigment. In the invention, it is suitable to use carbon black as the pigment. When using carbon black, any carbon black which has been generally used in ink jet ink can be used. Specifically, furnace black, acetylene black, channel black, thermal black, lamp black, and the like are mentioned.

Salt

In the invention, the "salt" means a compound containing cation and anion as described above. In the invention, the salt may be present in a state where the salt is entirely or partially dissociated in the ink. The "containing the salt" includes the state where the salt is present in the dissociated state.

As the salt usable in the ink of the invention, a combination of the following cations and anions are mentioned. Specifically, as the cations, alkali metal ions, such as $Li^-$, $Na^+$, and $K^+$, ammonium ions, and organic ammonium ions are mentioned. Mentioned as the anions are $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$. Among the above, it is suitable to use in the invention a monovalent salt containing a monovalent cation and a monovalent anion, such as sodium sulfate which is a salt of $Na^+$ and $SO_4^{2-}$, potassium sulfate which is a salt of $K^+$ and $SO_4^{2-}$, sodium phthalate which is a salt of $Na^-$ and $C_6H_4(COO^-)_2$, and potassium phthalate which is a salt of $K^+$ and $C_6H_4(COO^-)_2$.

In the invention, the first black ink is required to contain the salt. In the invention, the content (mol) of the salt in 1 kg of the first black ink is suitably 0.01 mol or more and 0.15 mol or lower. When the content of the salt in 1 kg of the first black ink is lower than 0.01 mol, an aggregation reaction with the pigment in the second black ink is weak, so that the improvement effect of the optical density of an image is not sufficiently obtained in some cases. On the other hand, when the content of the salt in 1 kg of the first black ink is higher than 0.15 mol, an aggregation reaction with the pigment in the second black ink is strong, so that the pigment is likely to remain on the surface of the record medium, which results in the fact that the improvement effect of the highlighter resistance of an image is not sufficiently obtained in some cases. Furthermore, the discharge stability of the first black ink is not sufficiently obtained in some cases.

In the invention, the second black ink may contain the salt. When the second black ink contains the salt, the content (mol) of the salt in 1 kg of the second black ink is suitably 0.03 mol or lower. When the content of the salt in 1 kg of the second black ink is higher than 0.03 mol, an aggregation reaction with the pigment is strong, so that the pigment is likely to remain on the surface of the record medium, which results in the fact that the improvement effect of the highlighter resistance of an image is not sufficiently obtained in some cases.

It is suitable that the content (% by mass) of the salt in the first black ink based on the total mass of the first black ink is 2.0 times or lower the content (% by mass) of the pigment in the first black ink. When the content is higher than 2.0 times, the content of the salt is high based on the content of the pigment, so that the dispersion stability of the pigment of the first black ink is not sufficiently obtained in some cases.

It is suitable that the content (% by mass) of the salt in the first black ink based on the total mass of the first black ink is 0.03 times or more the content (% by mass) of the pigment in the second black ink based on the total mass of the second black ink. When the content is lower than 0.03 times, the aggregation reaction of the pigments becomes weak when the second black ink and the first black ink contact each other, so that the improvement effect of the optical density of an image is not sufficiently obtained in some cases.

As a method for measuring the content of the salt in the ink, an ion chromatography method is mentioned. Specifically, solid components, such as the pigment, are removed from the ink by centrifugal separation or filtration to prepare a solution for measurement. The solution is measured using an ion chromatography analysis device using a separation column according to the ionicity to be measured, and then the content of the salt is calculated from a calibration curve created from a sample whose ion concentration is already known.

Aqueous Medium

In the invention, for the first black ink and the second black ink, water or an aqueous medium which is a mixed solvent of water and a water-soluble organic solvent can be used. The content (% by mass) of the water-soluble organic solvent in the ink is suitably 3.0% by mass or more and 50.0% by mass or lower based on the total mass of the ink. As the water-soluble organic solvent, any substance which has been generally used can be used. For example, alcohols, glycols, alkylene glycols containing an alkylene group having 2 to 6 carbon atoms, polyethylene glycols, nitrogen containing compounds, sulfur containing compounds, and the like are mentioned. These water-soluble organic solvents can be used singly or in combination of two or more kinds thereof as required. As water, ion exchanged water is suitably used. The content (% by mass) of water in the ink is suitably 50.0% by mass or more and 95.0% by mass or lower based on the total mass of the ink.

Surfactant

In the invention, for the first black ink and the second black ink, a surfactant can be used. As the surfactant, anionic surfactants, cationic surfactants, amphoteric surfactants, and nonionic surfactants are mentioned. In particular, since the dispersion stability of the pigment is not affected, the nonionic surfactants are suitably used. Specifically, mentioned as the nonionic surfactants are an ethylene oxide adduct of alkyl phenyl ether, a polyethylene oxide-polypropylene oxide copolymer, an ethylene oxide adduct of acetylene glycol, a fluorine-based surfactant, a silicone-based surfactant, and the like.

Other Components

In the invention, the first black ink and the second black ink may contain, in addition to the components mentioned above, a water-soluble organic compound which is a solid at normal temperature, such as polyhydric alcohols, such as trimethylolpropane and trimethylolethane, urea, and urea derivatives, such as ethylene urea, as required. In the invention, the ink may further contain various additives, such as a pH adjuster, an antirust, a preservative, an antifungal agent, an antioxidant, a reduction prevention agent, an evaporation accelerator, a chelating agent, and resin as required. In the invention, it is suitable that the ink does not contain a reaction agent.

Properties of First Black Ink and Second Black Ink

Surface Tension of Ink

In the invention, the static surface tension $\gamma_1$ of the first black ink is required to be higher than the static surface tension $\gamma_2$ of the second black ink as described above. The static surface tension $\gamma_1$ of the first black ink is suitably 38 mN/m or more and 60 mN/m or lower. On the other hand, the static surface tension $\gamma_2$ of the second black ink is suitably 45 mN/m or lower. The static surface tension $\gamma_2$ of the second black ink is suitably 20 mN/m or more. In the invention, the static surface tension of the ink is a value at 25° C. measured using a Wilhelmy method. In Examples described later, the static surface tension of the ink is measured using an automatic surface tension meter CBVP-Z (manufactured by Kyowa Interface Science Co., LTD) which is a surface tension meter employing the Wilhelmy method. The static surface tension of each ink can be adjusted based on the amount of the water-soluble organic solvent or the surfactant.

Permeability of Ink into Record Medium

As an evaluation method of the permeability of the ink into a record medium, a Bristow's method described in "Method of liquid absorption test on paper and board" of JAPAN TAPPI Paper pulp test method No. 51 is mentioned. The Bristow's method is defined by a wetting time Tw, an absorption coefficient Ka ($mL/m^2 \cdot ms^{1/2}$) and a roughness index Vr (mL/m$^2$). Among the above, the permeability of the ink into a record medium can be expressed by the absorption coefficient Ka. The permeability of the ink into a record medium is higher when the absorption coefficient Ka value is larger. The permeability of each ink into a record medium can be adjusted based on the amount of the water-soluble organic solvent or the surfactant.

In the invention, the absorption coefficient Ka value measured by the Bristow's method of the first black ink to plain paper is suitably 0.1 mL/m$^2$·ms$^{1/2}$ or more and 1.0 mL/m$^2$·ms$^{1/2}$ or lower. On the other hand, the absorption coefficient Ka value measured by the Bristow's method of the second black ink to plain paper is suitably 1.5 mL/m$^2$·ms$^{1/2}$ or more. In the invention, the absorption coefficient Ka value measured by the Bristow's method was measured by a dynamic permeability tester (Product name: Dynamic permeability tester S, manufactured by Toyo-Seiki Seisakusho, Ltd.) using plain paper (Product name: PPC paper GF-500, manufactured by CANON KABUSHIKI KAISHA) as a record medium.

EXAMPLES

The invention is described below in more detail with reference to Examples and Comparative Examples. The invention is not limited to the following Examples without departing from the scope of the invention. In the description of the following Examples, "part" is based on mass unless otherwise specified.

Preparation of Pigment Dispersion
Preparation of Pigment Dispersion A

MA77 (manufactured by Mitsubishi Chemical Corporation) commercially available as a self-dispersion carbon black in which a carboxyl group is bonded to the surface of carbon black was diluted with water, and then sufficiently stirred to thereby obtain a pigment dispersion A. The content of the pigment in the pigment dispersion A was 10.0% by mass.

Preparation of Pigment Dispersion B

A styrene-acrylic acid-ethyl acrylate copolymer with an acid value of 200 mgKOH/g and a weight average molecular weight of 5,000 was neutralized with an aqueous 10% by mass potassium hydrate solution. Then, 10 parts of carbon black FW18 (manufactured by Degussa), 4 parts of the neutralized styrene-acrylic acid-ethyl acrylate copolymer, and 86 parts of water were mixed. The mixture was dispersed for 3 hours using a batch type vertical sand mill, subjected to centrifugal separation treatment to remove coarse particles, and then filtered under pressure with a microfilter (manufactured by FUJIFILM CORPORATION) with a pore size of 3.0 μm. By the method described above, a pigment dispersion B in a state where the carbon black was dispersed in water by resin was obtained. The content of the pigment in the pigment dispersion B was 10.0% by mass and the content of the resin was 4.0% by mass.

Preparation of Black Ink

Each black ink was prepared by mixing components according to the compositions of Tables 1 and 2 using the pigment dispersions obtained above, sufficiently stirring the mixture, dispersing the resultant mixture, and then filtering the resultant mixture under pressure with a microfilter (manufactured by Fuji Photo Film) with a pore size of 3.0 μm. In Tables, acetylenol E100 is a polyoxyethylene acetylene glycol-based surfactant manufactured by Kawaken Fine Chemicals, BYK-348 is a silicone-based surfactant manufactured by BYK-Chemie Japan, and Zonyl FSO-100 is a fluorine-based surfactant manufactured by Du Pont. The obtained each ink was measured for the static surface tension and the absorption coefficient Ka value measured by the Bristow's method by the methods described above. The results are shown in Tables 1 and 2.

TABLE 1

Preparation conditions and properties of ink

| | | Black ink No. | | | | | | | | | |
|---|---|---|---|---|---|---|---|---|---|---|---|
| | | Ink 1 | Ink 2 | Ink 3 | Ink 4 | Ink 5 | Ink 6 | Ink 7 | Ink 8 | Ink 9 | Ink 10 |
| Pigment dispersion (Pigment content of 10.0% by mass) | Pigment dispersion A | 20.00 | 20.00 | 20.00 | 20.00 | 20.00 | 20.00 | — | 10.00 | 10.00 | 20.00 |
| | Pigment dispersion B | — | — | — | — | — | — | 13.00 | — | — | — |
| Salt | Sodium sulfate | 0.85 | 0.50 | — | 0.85 | 0.85 | 0.85 | — | — | — | 0.75 |
| | Sodium phthalate | — | — | — | — | — | — | 1.30 | 2.00 | 2.20 | — |
| Surfactant | Acetylenol E100 | — | — | — | 0.10 | 0.20 | 0.80 | — | 0.10 | 0.10 | 0.00 |
| | BYK-348 | — | — | — | — | — | — | — | — | — | — |
| | Zonyl FSO-100 | — | — | — | — | — | — | — | — | — | — |
| Glycerol | | 7.00 | 7.00 | 7.00 | 7.00 | 7.00 | 7.00 | 7.00 | 7.00 | 7.00 | 7.00 |
| Diethylene glycol | | 5.00 | 5.00 | 5.00 | 5.00 | 5.00 | 5.00 | 5.00 | 5.00 | 5.00 | 5.00 |
| 2-pyrolidone | | 3.00 | 3.00 | 3.00 | 3.00 | 3.00 | 3.00 | 3.00 | 3.00 | 3.00 | 3.00 |
| 1,2-hexanediol | | 1.00 | 1.00 | 1.00 | — | — | — | 0.50 | — | — | 0.50 |
| Water | | 63.15 | 63.50 | 64.00 | 64.05 | 63.95 | 63.35 | 70.20 | 72.90 | 72.70 | 63.75 |
| Salt content | | 0.85 | 0.50 | 0 | 0.85 | 0.85 | 0.85 | 1.30 | 2.00 | 2.20 | 0.75 |
| Pigment content | | 2.0 | 2.0 | 2.0 | 2.0 | 2.0 | 2.0 | 1.3 | 1.0 | 1.0 | 2.0 |
| Salt content/Pigment content | | 0.43 | 0.25 | 0 | 0.43 | 0.43 | 0.43 | 1.00 | 2.00 | 2.20 | 0.38 |
| Static surface tension (mN/m) | | 49 | 49 | 49 | 42 | 38 | 33 | 53 | 42 | 42 | 60 |
| Absorption coefficient Ka value measured by Bristow's method (mL/m$^2$ · ms$^{1/2}$) | | 0.5 | 0.5 | 0.4 | 0.3 | 0.4 | 2.0 | 0.2 | 0.2 | 0.2 | 0.1 |

TABLE 2

Preparation conditions and properties of ink

| | | Black ink No. | | | | | | | | |
|---|---|---|---|---|---|---|---|---|---|---|
| | | Ink 11 | Ink 12 | Ink 13 | Ink 14 | Ink 15 | Ink 16 | Ink 17 | Ink 18 | Ink 19 |
| Pigment dispersion (Pigment content of 10.0% by mass) | Pigment dispersion A | 20.00 | 40.00 | 40.00 | 40.00 | 25.00 | 40.00 | 40.00 | — | 40.00 |
| | Pigment dispersion B | — | — | — | — | — | — | — | 40.00 | — |
| Salt | Sodium sulfate | 0.75 | — | 0.21 | 0.36 | — | 0.21 | 0.21 | — | — |
| | Sodium phthalate | — | — | — | — | — | — | — | 0.32 | — |
| Surfactant | Acetylenol E100 | 0.00 | 1.00 | 1.00 | 0.50 | — | — | — | 1.00 | — |
| | BYK-348 | — | — | — | — | — | 1.00 | — | — | — |
| | Zonyl FSO-100 | — | — | — | — | — | — | 1.00 | — | — |
| Glycerol | | 7.00 | 7.00 | 7.00 | 7.00 | 7.00 | 7.00 | 7.00 | 7.00 | 7.00 |
| Diethylene glycol | | 5.00 | 5.00 | 5.00 | 5.00 | 5.00 | 5.00 | 5.00 | 5.00 | 5.00 |
| 2-pyrolidone | | 3.00 | 3.00 | 3.00 | 3.00 | 3.00 | 3.00 | 3.00 | 2.00 | 3.00 |
| 1,2-hexanediol | | 0.25 | 3.00 | 2.50 | 2.00 | 0.50 | 2.00 | 2.00 | — | 1.50 |
| Water | | 64.00 | 41.00 | 41.29 | 42.14 | 59.50 | 41.79 | 41.79 | 44.68 | 43.50 |
| Salt content | | 0.75 | 0 | 0.21 | 0.36 | 0 | 0.21 | 0.21 | 0.32 | 0 |
| Pigment content | | 2.0 | 4.0 | 4.0 | 4.0 | 2.5 | 4.0 | 4.0 | 4.0 | 4.0 |
| Salt content/Pigment content | | 0.38 | 0 | 0.05 | 0.09 | 0 | 0.05 | 0.05 | 0.08 | 0 |
| Static surface tension (mN/m) | | 65 | 34 | 35 | 38 | 50 | 28 | 20 | 32 | 45 |
| Absorption coefficient Ka value measured by Bristow's method (mL/m$^2 \cdot$ ms$^{1/2}$) | | 0.1 | 2.5 | 2.3 | 1.8 | 0.2 | 2.5 | 2.7 | 2.8 | 0.8 |

At this time, the pigment dispersion stability was higher in an ink 8 than in an ink 9.

Evaluation

Each black ink obtained above was charged into an ink cartridge, a set was prepared according to the combinations shown in Table 3, and then placed in an ink jet recording device. The ink jet recording device is controlled in such a manner that the first black ink and the second black ink are always recorded in the stated order. The recording conditions were a temperature of 25° C. and a relative humidity of 50%. In the ink jet recording device, an image recorded under the conditions where 4 droplets of 4 ng of the ink was applied to a unit region of 1/600 inch×1/600 inch) (1 pixel) with a resolution of 1200 dpi×1200 dpi is defined as an image with an ink recording duty of 100%. As a record medium, three kinds of recording media <PPC paper GF-500 (manufactured by CANON KABUSHIKI KAISHA), Standard plain paper LFM-PPS/24/68 (manufactured by CANON KABUSHIKI KAISHA), and Plotter plain paper LPL3-297B (Oce Japan Corporation)> were used.

Optical Density of Image

Solid images (2 cm×2 cm) were recorded on the three kinds of recording media using the ink jet device. At this time, the first black ink and the second black ink were applied in such a manner as to overlap each other at recording duties shown in Table 3. The image of each record medium was allowed to stand for 24 hours, and then the optical density of each image was measured using a reflection density meter X-Rite500 series (manufactured by X-Rite). The average value of the optical density of the images of the three kinds of recording media was calculated, and then the optical density of the images was evaluated according to the following evaluation criteria. In the invention, in the following evaluation criteria, A and B were regarded as suitable levels and C was regarded as a non-permissible level. The evaluation results are shown in Table 3.

A: The average value of the optical density of the images of the three kinds of recording media was 1.25 or more.

B: The average value of the optical density of the images of the three kinds of recording media was 1.15 or more and lower than 1.25.

C: The average value of the optical density of the images of the three kinds of recording media was lower than 1.15.

Highlighter Resistance of Image

Solid images (3 cm×3 cm) were recorded on the three kinds of recording media using the ink jet device. At this time, the first black ink and the second black ink were applied in such a manner as to overlap each other at recording duties shown in Table 3. An image highlighter resistance test using a highlighter pen was performed 5 minutes after discharging of an image of each record medium. The highlighter resistance test of images was performed by placing a spot writer V OA (manufactured by PILOT Corporation) on a highlighter pen operation jig. The highlighter pen operation jig brings the highlighter pen into operation with a pen nib load of 300 g and a movement speed of 100 mm/second to achieve marking. The highlighter resistance of the images was evaluated by visually observing the images and the highlighter pen nib after performing marking to the images of the three kinds of recording media using the highlighter pen operation jig. In the invention, the point was calculated by the following evaluation criteria for the images of the three kinds of recording media. The average value of the points of the images of the three kinds of recording media of 2.5 points or more was regarded as a suitable level and the average value of lower than 2.5 points was regarded as a non-permissible level. The evaluation results are shown in Table 3.

4 points: Both image disturbance and dirt of the pen nib were hardly observed.

3 points: Image disturbance and dirt of the pen nib were slightly observed but were not noticeable.

2 points: Image disturbance and dirt of the pen nib were observed.

1 point: Image disturbance and dirt of the pen nib were noticeable.

TABLE 3

Evaluation results

| Example No. | First ink No. | First ink Static surface tension $\gamma_1$ (mN/m) | First ink Recording duty (%) | Second ink No. | Second ink Static surface tension $\gamma_2$ (mN/m) | Second ink Recording duty (%) | Evaluation results Optical density of image | Evaluation results Image fastness |
|---|---|---|---|---|---|---|---|---|
| Example 1 | Ink 1 | 49 | 50 | Ink 12 | 34 | 75 | A | 4.0 |
| Example 2 | Ink 2 | 49 | 50 | Ink 12 | 34 | 75 | A | 4.0 |
| Example 3 | Ink 4 | 42 | 50 | Ink 12 | 34 | 75 | A | 4.0 |
| Example 4 | Ink 5 | 38 | 50 | Ink 12 | 34 | 75 | A | 4.0 |
| Example 5 | Ink 7 | 53 | 50 | Ink 18 | 32 | 75 | A | 4.0 |
| Example 6 | Ink 8 | 42 | 50 | Ink 12 | 34 | 75 | A | 4.0 |
| Example 7 | Ink 9 | 42 | 50 | Ink 12 | 34 | 75 | A | 4.0 |
| Example 8 | Ink 10 | 60 | 50 | Ink 12 | 34 | 75 | A | 3.0 |
| Example 9 | Ink 11 | 65 | 50 | Ink 12 | 34 | 75 | A | 2.5 |
| Example 10 | Ink 1 | 49 | 50 | Ink 13 | 35 | 75 | A | 4.0 |
| Example 11 | Ink 1 | 49 | 50 | Ink 14 | 38 | 75 | A | 4.0 |
| Example 12 | Ink 1 | 49 | 50 | Ink 19 | 45 | 75 | A | 3.0 |
| Example 13 | Ink 1 | 49 | 50 | Ink 16 | 28 | 75 | A | 4.0 |
| Example 14 | Ink 1 | 49 | 50 | Ink 17 | 20 | 75 | A | 4.0 |
| Example 15 | Ink 1 | 49 | 20 | Ink 12 | 34 | 90 | B | 4.0 |
| Example 16 | Ink 1 | 49 | 80 | Ink 14 | 38 | 50 | B | 3.0 |
| Comparative Example 1 | Ink 3 | 49 | 50 | Ink 12 | 34 | 75 | C | 3.0 |
| Comparative Example 2 | Ink 3 | 49 | 50 | Ink 15 | 50 | 75 | A | 1.0 |
| Comparative Example 3 | Ink 12 | 34 | 75 | Ink 1 | 49 | 50 | C | 2.0 |
| Comparative Example 4 | Ink 6 | 33 | 50 | Ink 12 | 34 | 75 | C | 4.0 |
| Comparative Example 5 | Ink 1 | 49 | 50 | Ink 15 | 50 | 75 | A | 1.0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-165882 filed Jul. 26, 2012, which is hereby incorporated by reference herein in its entirety.

What is claimed is:

1. An image recording method, comprising:
a first step of applying a first black ink containing a pigment to a record medium; and
after the first step, a second step of applying a second black ink containing a pigment to the record medium such that the second ink at least partly overlaps the first black ink, wherein
the first black ink contains a salt containing at least one kind of cation selected from the group consisting of an alkali metal ion, an ammonium ion, and an organic ammonium ion and at least one kind of anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$, and
a static surface tension of the first black ink is higher than a static surface tension of the second black ink.

2. The image recording method according to claim 1, wherein a content (% by mass) of the salt in the first black ink based on a total mass of the first black ink is 2.0 times or lower a content (% by mass) of the pigment in the first black ink.

3. The image recording method according to claim 1, wherein the static surface tension of the first black ink is 38 mN/m or more and 60 mN/m or lower.

4. The image recording method according to claim 1, wherein the static surface tension of the second black ink is 45 mN/m or lower.

5. The image recording method according to claim 1, wherein the salt in the first black ink is at least one kind selected from sodium sulfate, potassium sulfate, sodium phthalate, and potassium phthalate.

6. The image recording method according to claim 1, wherein the content of the pigment in the first black ink is 1.0% by mass or more and 3.0% by mass or lower, and the content of the pigment in the second black ink is 3.0% by mass or more and 6.0% by mass or lower.

* * * * *